United States Patent
Clark

(10) Patent No.: US 7,477,162 B2
(45) Date of Patent: Jan. 13, 2009

(54) WIRELESS ELECTROMAGNETIC TELEMETRY SYSTEM AND METHOD FOR BOTTOMHOLE ASSEMBLY

(75) Inventor: Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 506 days.

(21) Appl. No.: 11/248,974

(22) Filed: Oct. 11, 2005

(65) Prior Publication Data

US 2007/0247330 A1   Oct. 25, 2007

(51) Int. Cl.
*G01V 3/00* (2006.01)

(52) U.S. Cl. .............. 340/854.6; 175/40; 166/248; 340/854.4; 343/719

(58) Field of Classification Search .......... 340/854.4, 340/854.6; 175/40, 35; 166/248, 254.2; 343/719
See application file for complete search history.

(56) References Cited

U.S. PATENT DOCUMENTS

| | | |
|---|---|---|
| 4,348,672 A | 9/1982 | Givler |
| 4,689,572 A | 8/1987 | Clark |
| 4,704,581 A | 11/1987 | Clark |
| 4,712,070 A | 12/1987 | Clark et al. |
| 4,780,678 A | 10/1988 | Kleinberg et al. |
| RE32,913 E | 4/1989 | Clark |
| 4,845,433 A | 7/1989 | Kleinberg et al. |
| 4,857,852 A | 8/1989 | Kleinberg et al. |
| 4,876,511 A | 10/1989 | Clark |
| 4,899,112 A | 2/1990 | Clark et al. |
| 4,933,649 A | 6/1990 | Swanson et al. |
| 4,949,045 A | 8/1990 | Clark et al. |
| 4,968,940 A | 11/1990 | Clark et al. |
| 5,095,761 A | 3/1992 | Nortz et al. |
| 5,160,925 A * | 11/1992 | Dailey et al. .......... 340/853.3 |
| 5,200,705 A | 4/1993 | Clark et al. |
| 5,235,285 A | 8/1993 | Clark et al. |
| 5,265,682 A | 11/1993 | Russell et al. |
| 5,339,036 A | 8/1994 | Clark et al. |
| 5,359,324 A | 10/1994 | Clark et al. |
| 5,373,481 A | 12/1994 | Orban et al. |
| 5,396,232 A | 3/1995 | Mathieu et al. |
| 5,467,832 A | 11/1995 | Orban et al. |
| 5,520,255 A | 5/1996 | Barr et al. |
| 5,594,343 A | 1/1997 | Clark et al. |
| 6,057,784 A | 5/2000 | Schaaf et al. |
| 6,188,222 B1 | 2/2001 | Seydoux et al. |
| 6,297,639 B1 | 10/2001 | Clark et al. |
| 6,308,137 B1 | 10/2001 | Underhill et al. |
| 6,351,127 B1 | 2/2002 | Rosthal et al. |
| 6,392,561 B1 | 5/2002 | Davies et al. |
| 6,439,324 B1 | 8/2002 | Ringgenberg et al. |
| 6,509,738 B1 | 1/2003 | Minerbo et al. |

(Continued)

*Primary Examiner*—Timothy Edwards, Jr.
(74) *Attorney, Agent, or Firm*—Jonna Flores; Darla Fonseca; Dale Gaudier

(57) ABSTRACT

A wireless electromagnetic telemetry system for broadcasting signals across a bottomhole assembly disposed in a borehole drilled through a subterranean formation includes an insulated gap at a first point in the bottomhole assembly, at least one magnetic field sensor at a second point in the bottomhole assembly which measures a magnetic field, and a circuitry which modulates a voltage across the insulated gap, wherein the voltage creates an axial current along the bottomhole assembly that results in the magnetic field.

29 Claims, 8 Drawing Sheets

U.S. PATENT DOCUMENTS

| | | |
|---|---|---|
| 6,557,794 B2 | 5/2003 | Rosthal et al. |
| 6,573,722 B2 | 6/2003 | Rosthal et al. |
| 6,577,244 B1 | 6/2003 | Clark et al. |
| 6,614,229 B1 | 9/2003 | Clark et al. |
| 6,624,634 B2 | 9/2003 | Rosthal et al. |
| 6,680,613 B2 | 1/2004 | Rosthal et al. |
| 6,693,430 B2 | 2/2004 | Rosthal et al. |
| 6,710,601 B2 | 3/2004 | Rosthal et al. |
| 6,727,705 B2 | 4/2004 | Frey et al. |
| 6,727,827 B1 | 4/2004 | Edwards et al. |
| 6,788,263 B2 | 9/2004 | Clark et al. |
| 6,836,218 B2 | 12/2004 | Frey et al. |
| 6,863,127 B2 | 3/2005 | Clark et al. |
| 6,885,308 B2 | 4/2005 | Smith et al. |
| 6,903,660 B2 | 6/2005 | Clark et al. |
| 2004/0069514 A1* | 4/2004 | Rodney et al. ............ 174/35 R |
| 2004/0119607 A1* | 6/2004 | Davies et al. ............ 340/854.4 |
| 2005/0041526 A1 | 2/2005 | Esmersoy et al. |
| 2005/0109538 A1 | 5/2005 | Fisseler et al. |
| 2005/0167098 A1 | 8/2005 | Lovell et al. |
| 2007/0018848 A1* | 1/2007 | Bottos et al. ............ 340/854.4 |

* cited by examiner

WIRELESS ELECTROMAGNETIC TELEMETRY SYSTEM AND METHOD FOR BOTTOMHOLE ASSEMBLY

BACKGROUND OF THE INVENTION

The invention relates generally to methods and systems for passing signals between a surface unit and downhole tools disposed in a borehole penetrating a subterranean formation.

The lower portion of a drill string for drilling a borehole in a subterranean formation is typically referred to as a bottomhole assembly. In general, the bottomhole assembly includes downhole tools that perform various downhole operations in the borehole. It is often necessary to send commands to one or more of these downhole tools in order to control operation of the downhole tool. For example, the bottomhole assembly may include a rotary steerable system that allows a borehole to be drilled in a formation directionally. To set the direction and inclination of the borehole segment being drilled, a command is sent from a surface location to the rotary steerable system.

In another example, the bottomhole assembly may include various formation evaluation tools, such as a logging-while-drilling (LWD) tool or measurement while drilling (MWD) tool designed to measure formation parameters. Certain formation evaluation tools, such as a formation pressure while drilling tool as described in US Patent Application No. 20050109538, may also be used to measure pressure using a probe that extends to contact the formation. For this operation, the pressure in the probe is momentarily brought below the formation pressure to draw formation fluid into the probe. Once the probe stabilizes at the formation pressure, the probe is retracted. These formation evaluation tools typically require commands to be sent from a surface location to the downhole tool. Typically, commands are sent to downhole tools using a telemetry system, such as a mud pulse system that manipulates flow of drilling mud through the drill string to create pressure pulses. This generally requires that the rate of surface mud pumps is adjusted manually, a process that can take several minutes and interferes with the drilling process.

MWD tools are typically provided with a telemetry component adapted to communicate with a surface unit. The telemetry component may be a mud pulse, electromagnetic (EMAG), acoustic or other telemetry device. In cases involving MWD tools having EMAG telemetry, the MWD-EMAG telemetry tools use relatively low frequency EMAG waves to communicate from a downhole location to a surface location. A typical MWD-EMAG telemetry tool includes a drill collar having an insulated gap and circuitry that creates a modulated voltage across the insulated gap. See, for example, U.S. Pat. No. 4,348,672. If the MWD-EMAG telemetry tool is included in a bottomhole assembly, the voltage across the insulated gap typically results in a large electric current flow along the drill string near the MWD-EMAG telemetry tool. Some current typically also flows through the earth and produces a weak electric field that is detected at the surface with two or more electrodes driven into the ground.

MWD-EMAG telemetry tools can be configured to receive signals from the surface via electric currents generated at the surface. These received signals may be communicated to other downhole tools in the bottomhole assembly if the MWD-EMAG telemetry tools can communicate with these downhole tools. One possibility is for internal or external wire links to be formed between an MWD-EMAG telemetry tool and other downhole tools to enable transmission of signals. However, it is sometimes impossible or impractical to run wires between downhole tools in a bottomhole assembly. For example, in a bottomhole assembly including a rotary steerable system, a mud motor may be positioned between the MWD-EMAG telemetry tool and the rotary steerable system. Passing a wire through the mud motor and connecting the wire to tools below the mud motor would be very difficult since the mud motor shaft rotates at a high speed and is attached to collars and/or the drill bit. A rotating connector would be required to make the wire connection, but such a rotating connector is unlikely to be reliable. Other methods of communicating through a mud motor can be complex (see, for example, U.S. Pat. No. 5,160,925) and may be unavailable on standard commercially available motors.

There are other examples where it may be cumbersome or impossible to form internal or external wire links between the MWD-EMAG telemetry tool and other downhole tools in a bottomhole assembly. For example, a typical power-drive rotary steerable system has a control unit that is held geostationary while the drill collar containing the control unit rotates about the control unit. In this case, running an electrical connection from the MWD-EMAG telemetry tool to the drill collar and control unit would be very difficult. The connection between the rotating drill collar and the geostationary control unit would require a rotating connection, which is unlikely to be reliable in a borehole environment. In cases where purely mechanical hardware, such as under-reamers and jars, are placed between the MWD-EMAG telemetry tool and a downhole tool, these mechanical hardware would likely have to be wired as well.

In another example, the bottomhole assembly may include a LWD seismic tool having an array of geophones or hydrophones for detecting seismic waves. These seismic sensors (geophones or hydrophones) are typically required to be placed 60 to 70 feet apart along the drill string and can acquire data only when the drill string is stationary and when the mud pumps are off, as described in, for example, U.S. Pat. No. 6,308,137. An MWD-EMAG telemetry tool could be useful in this case if it can communicate with the LWD tool. For example, the MWD-EMAG telemetry tool could detect the desirable conditions for LWD seismic measurement, i.e., stationary drill string and no mud circulation, and could communicate this to the seismic sensors in the LWD tool so that the seismic sensors can make the measurement. However, it would be impractical to run the long wires needed to make the signal transmission links between the MWD-EMAG telemetry tool and each of the seismic sensors in the LWD tool.

From the foregoing, it would be desirable in many situations to have a wireless telemetry system to transmit signals between an MWD-EMAG telemetry tool and other downhole tools in a bottomhole assembly or as a backup for other communications systems, such as wired systems. Wireless telemetry systems have been used in a bottomhole assembly. In one example, electromagnetic induction is generated using coils wrapped around drill collars, as described in U.S. Pat. No. 6,057,784. In another example, transformer coupling are formed using toroids mounted externally on drill collars, as described in U.S. Pat. Nos. 5,359,324 and 5,467,832. These wireless telemetry systems work well, but adding either type to an MWD-EMAG telemetry tool and other downhole tools, such as a rotary steerable system, in a bottomhole assembly would significantly increase the cost of the bottomhole assembly, increase the length of the bottomhole assembly, and add components to the bottomhole assembly that can easily fail. A wireless telemetry system that enables communication between the EMAG telemetry tool and downhole tools without these drawbacks may be beneficial.

SUMMARY OF THE INVENTION

In one aspect, the invention relates to a wireless electromagnetic telemetry system for broadcasting signals across a bottomhole assembly disposed in a borehole drilled through a subterranean formation. The wireless electromagnetic telemetry system comprises an insulated gap at a first point in the bottomhole assembly, at least one magnetic field sensor at a second point in the bottomhole assembly which measures a magnetic field, and a circuitry which modulates a voltage across the insulated gap, wherein the voltage creates an axial current along the bottomhole assembly which results in the magnetic field.

In another aspect, the invention relates to a bottomhole assembly including a wireless electromagnetic telemetry system which includes a wireless electromagnetic telemetry system that enables broadcasting of signals across the bottomhole assembly. The bottomhole assembly includes an insulated gap located in a first downhole tool in the bottomhole assembly and at least one magnetic field sensor located in a second downhole tool in the bottomhole assembly. The magnetic field sensor is configured to measure a magnetic field at the second downhole tool. The bottomhole assembly further includes a circuitry connected across the insulated gap which modulates a voltage across the insulated gap, wherein modulation of the voltage creates an axial current along the bottomhole assembly that produces the magnetic field.

In yet another aspect, the invention relates to a method of broadcasting a signal across a bottomhole assembly disposed in a borehole drilled through a subterranean formation. The method comprises producing a voltage across an insulated gap at a first point in the bottomhole assembly and modulating the voltage produced across the gap, wherein the voltage creates an axial current and a magnetic field along the borehole assembly. The method further includes measuring the magnetic field at a second point in the bottomhole assembly using one or more magnetic field sensors.

Other features and advantages of the invention will be apparent from the following description and the appended claims.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 1A:
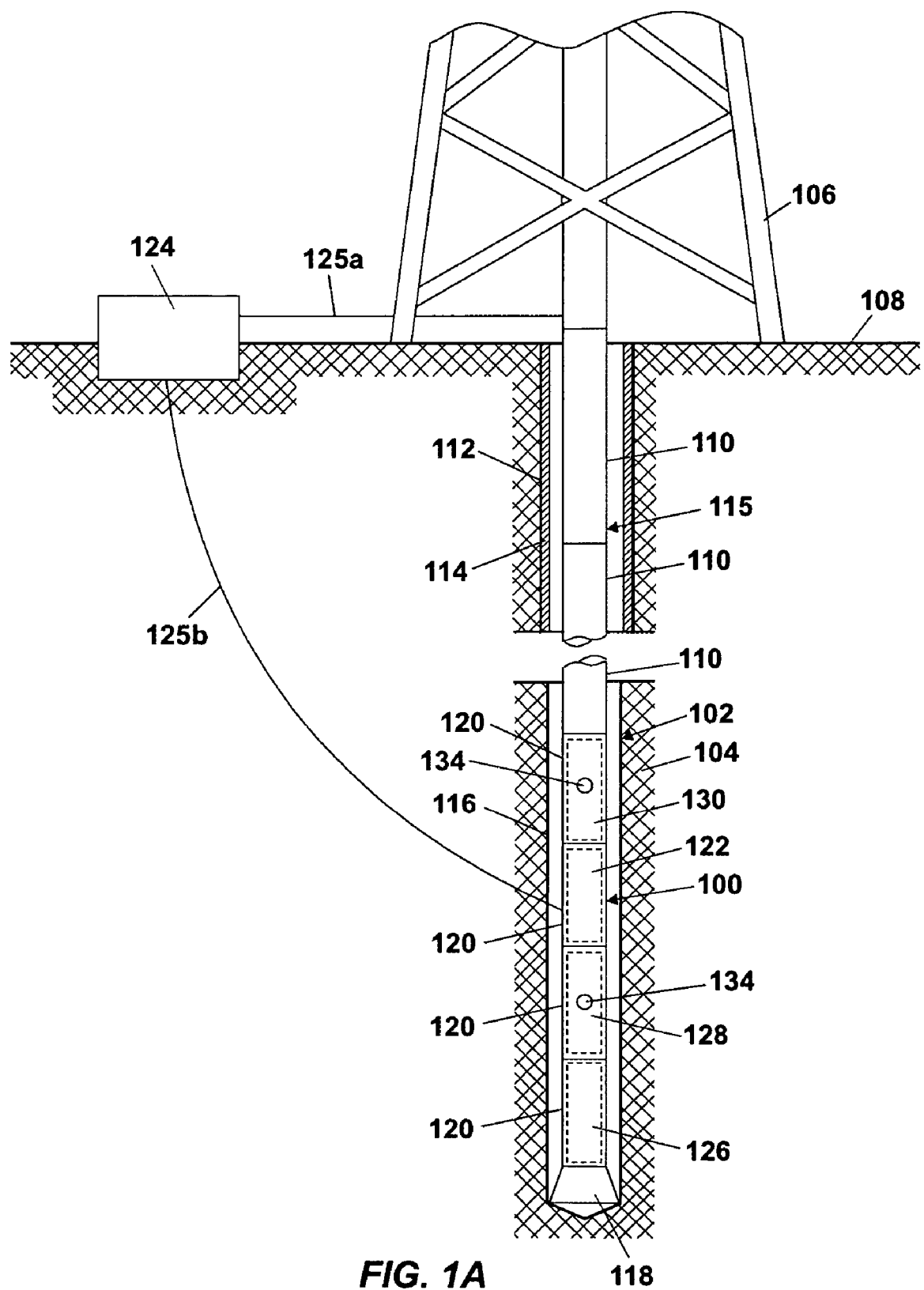
FIG. 1A is a schematic of a downhole tool deployed from a rig into a wellbore via a drill string.

FIG. 1A depicts a bottomhole assembly 100 suspended in a borehole 102 in a subterranean formation 104 from a rig 106 at the surface 108. The bottomhole assembly 100 is suspended in the borehole 102 by drill pipes 110. Alternatively, the bottomhole assembly 100 may be suspended in the borehole 102 by coiled tubing and the like. For drilling operations, the means of suspending the bottomhole assembly 100 in the borehole 102 must provide a conduit for drilling mud. In one example, the drill pipes 110 allow the bottomhole assembly 100 to be translated and rotated inside the borehole 102. In another example, the drill pipes 110 and bottomhole assembly 100 form a drill string 115 that can be used to advance the borehole 102.

The bottomhole assembly 100 includes a drill bit 118 and a plurality of drill collars 120 coupled together and to the drill bit 118. Each of the drill collars 120 may contain one or more tools (or part of a tool) adapted for performing one or more downhole operations. Those skilled in the art will appreciate that the configuration of a bottomhole assembly can be highly variable depending on the operations to be performed downhole. In this disclosure, the essential components that would enable wireless communication between downhole tools in a bottom assembly would be highlighted.

The bottomhole assembly 100 includes an electromagnetic (EMAG) telemetry tool 122 that uses EMAG waves to receive signals from and transmit signals to a surface system 124. These EMAG waves are typically of a low frequency. There may or may not be a one-to-one correspondence between the EMAG telemetry tool 122 and a drill collar 120. That is, the EMAG telemetry tool 122 may be contained within a single drill collar 120, or components of the EMAG telemetry tool 122 may be spread across multiple drill collars 120. For simplicity, the EMAG telemetry 122 is shown as contained within a single drill collar. The EMAG telemetry tool 122 may be a standalone tool or may be a component of a measurements-while-drilling (MWD) tool, such as those described in U.S. Pat. Nos. 4,876,511 and 4,968,940.

The downhole assembly 100 also includes one or more downhole tools, e.g., tools 126, 128, and 130, configured to perform one or more downhole operations. Such tools include, but are not limited to, logging-while-drilling (LWD) tools, MWD tools, and directional drilling tools, e.g., rotary steerable systems. Tools 126, 128, and 130 are contained within the drill collars 120 and may be located above or below the EMAG telemetry tool 122. Preferably, communication is provided between one or more of the tools, particularly in cases when it is impractical or impossible to form hardwired signal transmission links between the EMAG telemetry tool 122 and the downhole tools 126, 128, and 130. The EMAG telemetry tool 122 broadcasts signals received from the surface system 124 to any one of the tools 126, 128, and 130 wirelessly. The EMAG telemetry tool 122 may receive signals from the surface system 124 through the drill pipes 110, as indicated by signal transmission link 125a, or through the formation 104, as indicated by signal transmission link 125b. The EMAG telemetry tool 122 may also receive signals from any one of the tools 126, 128, and 130 and may transmit such signals to the surface system 124 or to another one of the tools 126, 128, and 130.

Figure 1B:
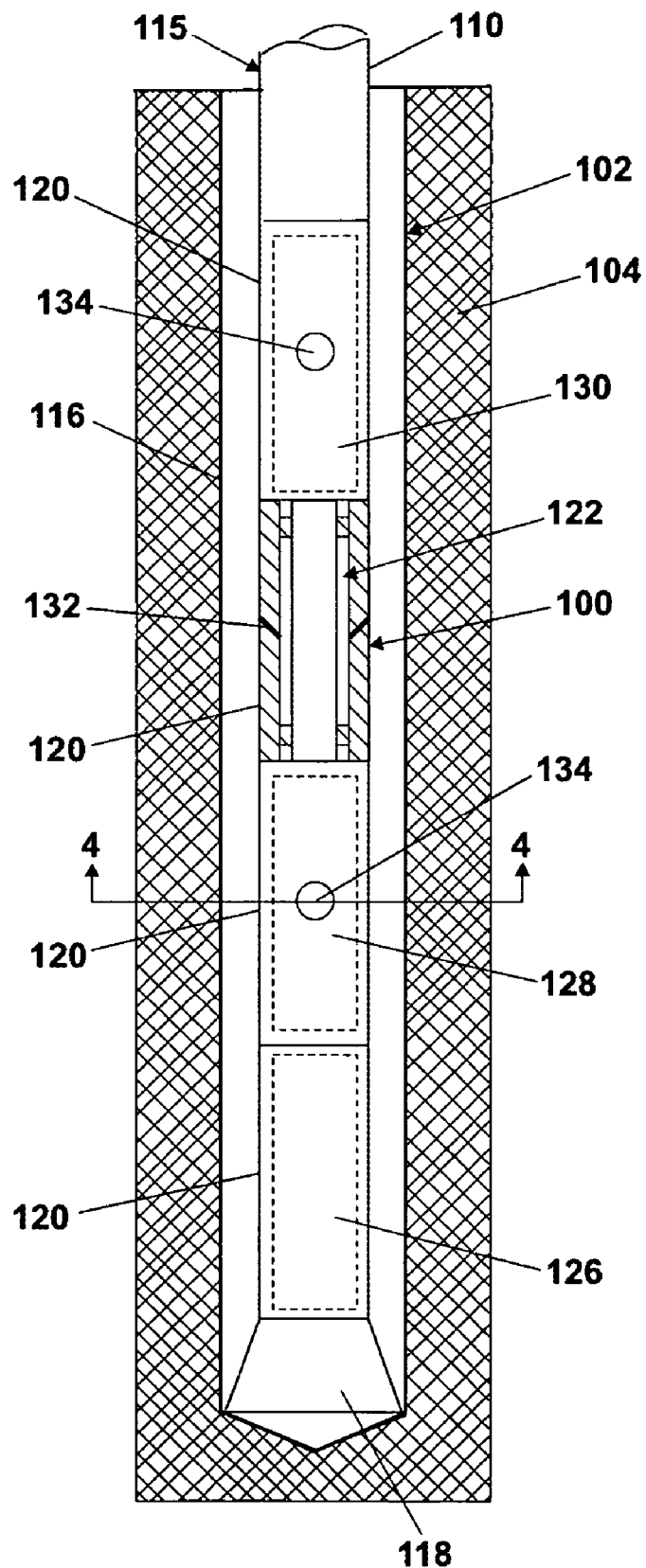
FIG. 1B is a schematic of a portion of the downhole tool of FIG. 1A depicting a bottomhole assembly in greater detail.

FIG. 1B shows an enlarged view of the bottomhole assembly 100. In this enlarged view, the EMAG telemetry tool 122 includes an insulated gap 132. The insulated gap 132 may simply be an insulating coating at a connection between two sections of a drill collar. However, the invention is not limited by the method by which the insulated gap 132 is implemented. Examples of insulated gaps for EMAG telemetry are described in, for example, US Patent Application Ser. No. 2005/0167098. The EMAG telemetry tool 122 communicates with a downhole tool, e.g., tool 128, by modulating a voltage across the insulated gap 132 according to a signal to be transmitted to the downhole tool. The voltage across the insulated gap 132 results in a large axial current, e.g., up to ten or more amps, that flows along the drill string 115. The axial current produces an azimuthal magnetic field, primarily outside the drill collars 120. This magnetic field is measured directly by one or more magnetic field sensors 134 at the receiving downhole tool, e.g., tool 128. The receiving downhole tool deciphers the transmitted signal from the measured magnetic field.

Figure 2A:
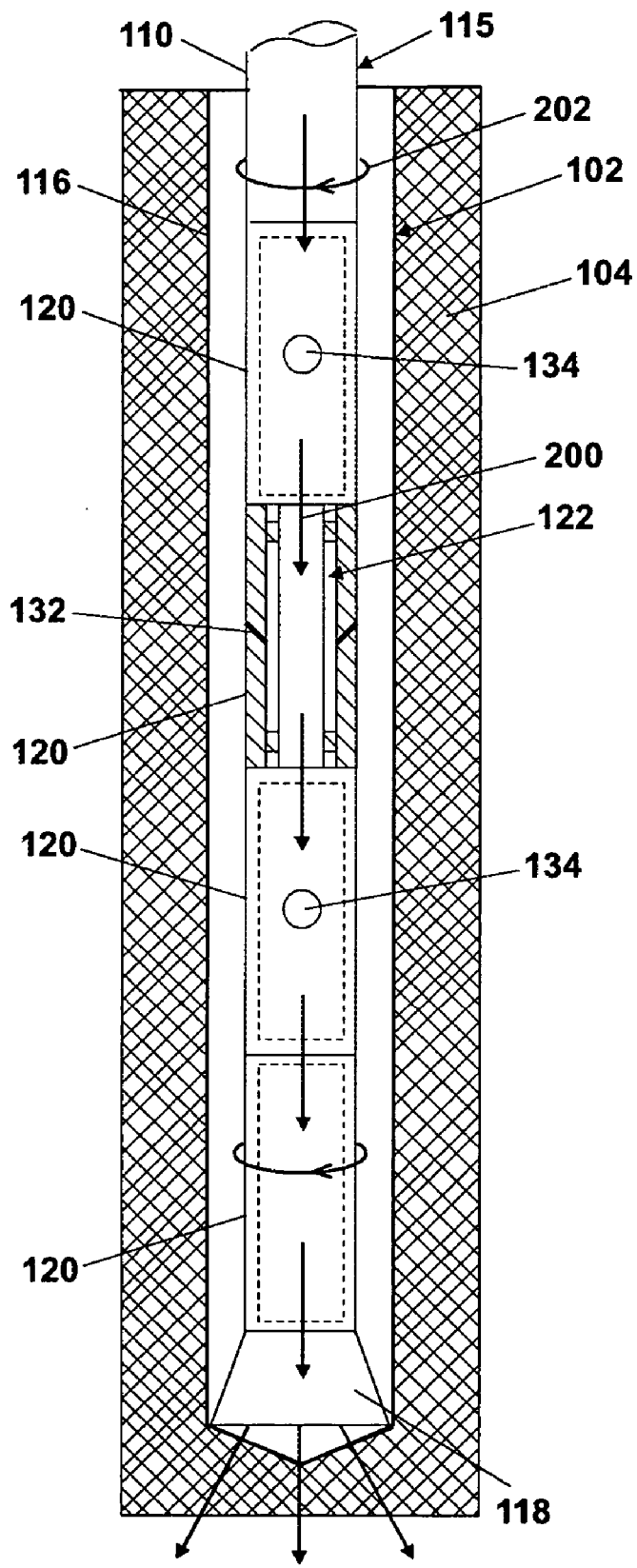
FIG. 2A is a schematic of a portion of the downhole tool of FIG. 1B depicting a bottomhole assembly depicting an axial flow of current passing therethrough.

FIG. 2A depicts the insulation gap 132 in a borehole 102 filled with an oil-based mud or other fluid having little or no electrical conductivity. The straight arrows 200 represent the axial flow of current along the drill string 115. The circular arrows 202 represent the magnetic field created by the axial current in the drill string 115. The oil-based mud tends to electrically insulate the drill string 115 from the formation 104, except where there is hard physical contact between the drill string 115 and the formation 104. Almost all the current below the EMAG telemetry tool 122 enters the formation 104 through the drill bit 118. Thus, the current between the EMAG telemetry tool 122 and the drill bit 118 remains roughly constant in amplitude. Above the EMAG telemetry tool 122, the current returns to the drill string 115 through a number of places where the drill string 115 contacts the formation 104. Such contact points may include stabilizer blades (not shown), or simply a large number of drill pipes lying against the formation 104.

Figure 2B:
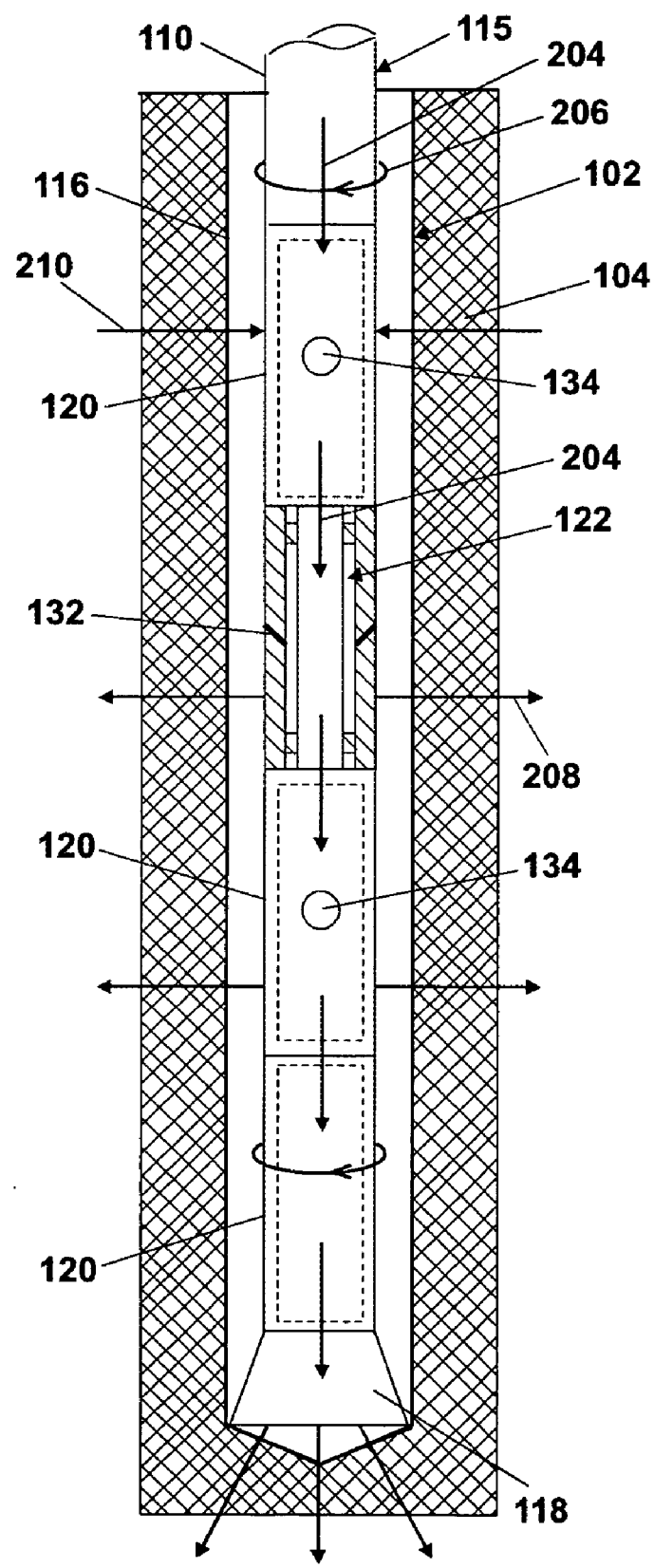
FIG. 2B is a schematic of a portion of the downhole tool of FIG. 1B depicting a radial flow of current passing therethrough.

FIG. 2B depicts the insulation gap 132 in a borehole 102 filled with a water-based mud or other fluid having electrical conductivity. The axial arrows 204 represent the axial current flowing along the drill string 115. The circular arrows 206 represent the magnetic field created by the axial current in the drill string 115. Because the water-based mud is electrically conductive, it allows radial current to flow into the formation 104 along the length of the drill string 115, as depicted by radial arrows 208. Current can also flow from the formation 104 into the drill string 115, as depicted by radial arrows 210. Below the EMAG telemetry tool 122, the current on the drill string 115 decreases approximately linearly and is small at the face of the drill bit 118. Above the EMAG telemetry tool 122, the current on the drill string 115 initially decreases approximately linearly, but eventually decreases exponentially with distance (d) measured axially from the EMAG telemetry tool 122 according to $e^{-d/\delta}$, where $\delta$ is the skin depth. The skin depth is the distance that an electromagnetic wave travels in a conductive medium such that it decreases by the amount $1/e=0.368$. The skin depth in meters is given by:

$$\delta = \frac{1}{\sqrt{\pi f \mu_0 \sigma}} \quad (1)$$

where f is frequency, $\mu_0 = 4\pi \cdot 10^{-7}$ H/m, and $\sigma$ is the formation conductivity. Formation conductivities generally fall within the range from 0.001 S/m to 5 S/m. At an operating frequency of 10 Hz, the skin depth ranges from 5 km to 72 m respectively for this range of formation resistivities.

For both the oil-based mud (FIG. 2A) and the water-based mud (FIG. 2B), a strong axial current flows along the drill string 115 between the EMAG telemetry tool 122 and the drill bit 118. The axial current also flows a significant distance above the EMAG telemetry tool 122 in the open hole section 116 of the borehole 102. However, physical contact of the drill string 115 with the cased section (112 in FIG. 1A) may result in electrical short, and thereby limit flow of axial current on the drill string 115 above the open hole section 116. The voltage along the drill string 115 is essentially constant on either side of the insulated gap 132 because drill collars 120 and drill pipes 110 have very high conductivities, typically greater than $10^6$ S/m. Therefore, in some cases, it may be difficult to base a wireless telemetry system on measuring the voltages at different locations on the drill string 115. A robust wireless telemetry system typically uses the axial current on the drill string 115 rather than the voltage along the drill string 115 to send signals from the EMAG telemetry tool 122 to downhole tools.

The axial current (I(z)) along the drill string 115 produces an azimuthal magnetic field (B) primarily outside of the drill collars 120, given by:

$$B(r) = \mu_0 \frac{I(z)}{2\pi r} \quad (2)$$

where r is the radius measured from the longitudinal axis of the drill string 115. This magnetic field can be directly measured with one or more magnetic field sensors 134 located in one or more of the drill collars 120. Any sensor that can reliably measure magnetic field under borehole conditions can be used. One example of suitable magnetic field sensors are fluxgate magnetometers.

Returning to FIG. 1A, the EMAG telemetry tool 122 modulates the axial current on the drill string 115 to send commands and/or data to other downhole tools, such as tools 126, 128, and 130. The frequency and/or modulation protocol can be different for communications between the EMAG telemetry tool 122 and other downhole tools and communications between the EMAG telemetry tool 122 and the surface system 124. For example, communications between the EMAG telemetry tool 122 and the surface system 124 could run at a first frequency, e.g., 1 Hz (to provide sufficient signal-to-noise for the surface communication), while communications between the EMAG telemetry tool 122 and downhole tools could run at a second frequency, e.g., 10 Hz. Communications between the EMAG telemetry tool 122 and the different downhole tools could also run at different frequencies. The azimuthal magnetic field associated with the axial current can be measured using magnetic field sensors 134 placed on the outside or inside of a drill collar 120 at the receiving location.

Figure 3A:
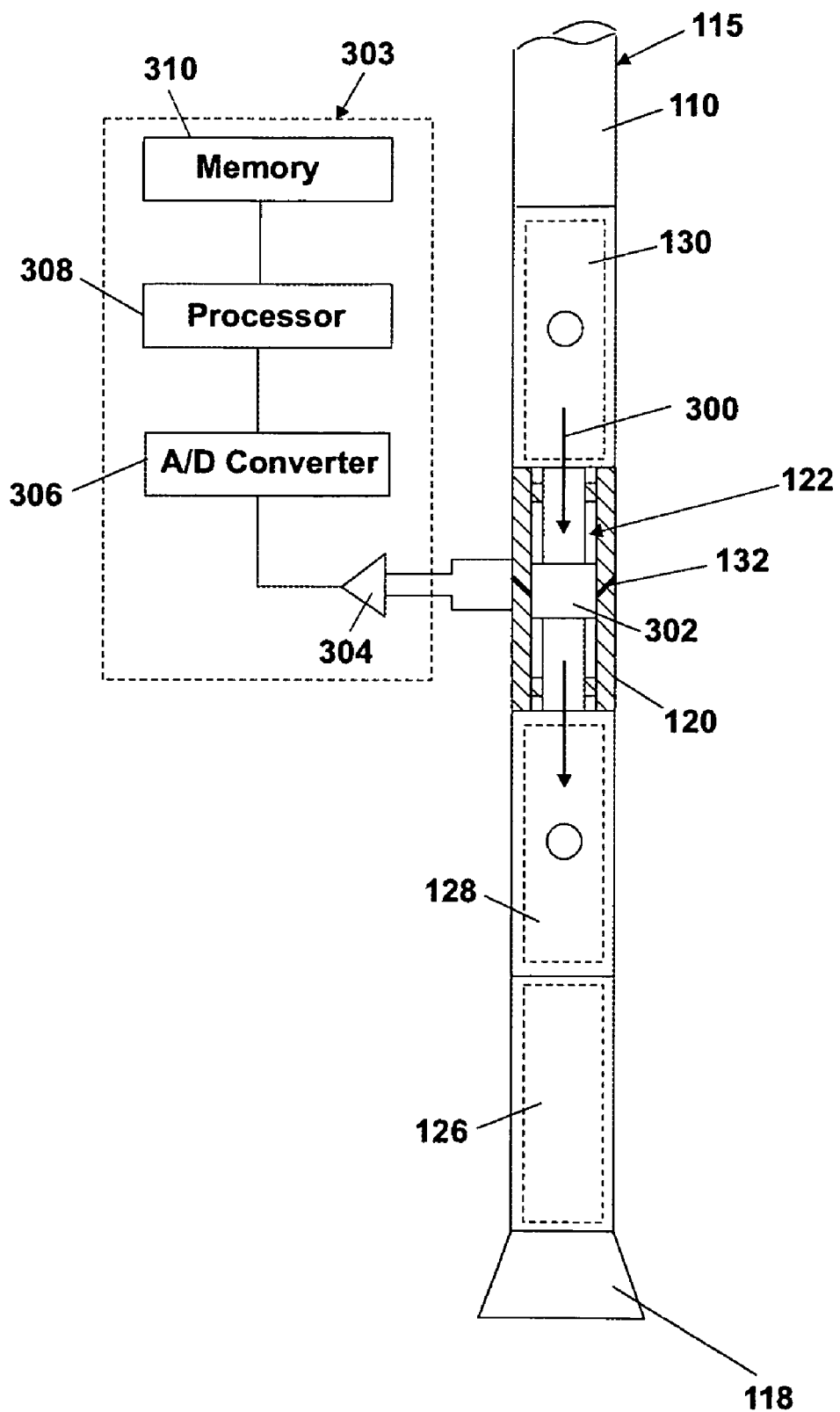
FIG. 3A is a schematic of the portion of the downhole tool of FIG. 1B illustrating reception of a signal at an EMAG telemetry tool in the bottomhole assembly.

FIG. 3A depicts reception of signals at the EMAG telemetry tool 122. The signals may have been sent from the surface system 124 through either of the signal transmission links (125a, 125b in FIG. 1A). For illustration purposes, it is assumed that sending of the signals includes transmitting current, represented by arrows 300, to the drill collar 120 including the insulated gap 132. The current on the drill collar 120 produces a small voltage across the insulated gap 132. The EMAG telemetry tool 122 includes circuitry, represented by 302, which connects across the insulated gap 132 and is operable to alter the impedance across the insulated gap 132. The EMAG telemetry tool 122 includes circuitry 303 for processing received signals. It should be noted that circuitry 303 is shown outside the EMAG drill collar 120 to facilitate understanding of the invention. Normally, the circuitry 303 would be mounted within the EMAG drill collar 120. In the illustrated example, the circuitry 303 includes a high-gain, low-noise amplifier 304, an analog-to-digital (A/D) converter 306, a processor 308, and memory 310. Those skilled in the art would appreciate that circuitry 303 can be replaced with other equivalent receiving circuitry.

The surface system (124 in FIG. 1A) preferably generates current according to a signal to be transmitted to a downhole tool. The current is transmitted to the EMAG drill collar 120 including the insulated gap 132 through, for example, the drill pipes 110 or the formation (104 in FIG. 1A). The current on the EMAG drill collar 120 produces a small voltage across the insulated gap 132. The circuitry 302 is switched into an open condition so that impedance across the insulated gap 132 is extremely high. The voltage across the insulated gap 132 is fed to the inputs of the high-gain, low-noise amplifier 304. The output of the high-gain, low-noise amplifier 304 feeds the A/D converter 306. The output of the A/D converter 306 is analyzed by the processor 308, which decodes the received signal and loads the result into memory 310. The signal loaded into memory 310 can now be broadcasted to a downhole tool.

Figure 3B:
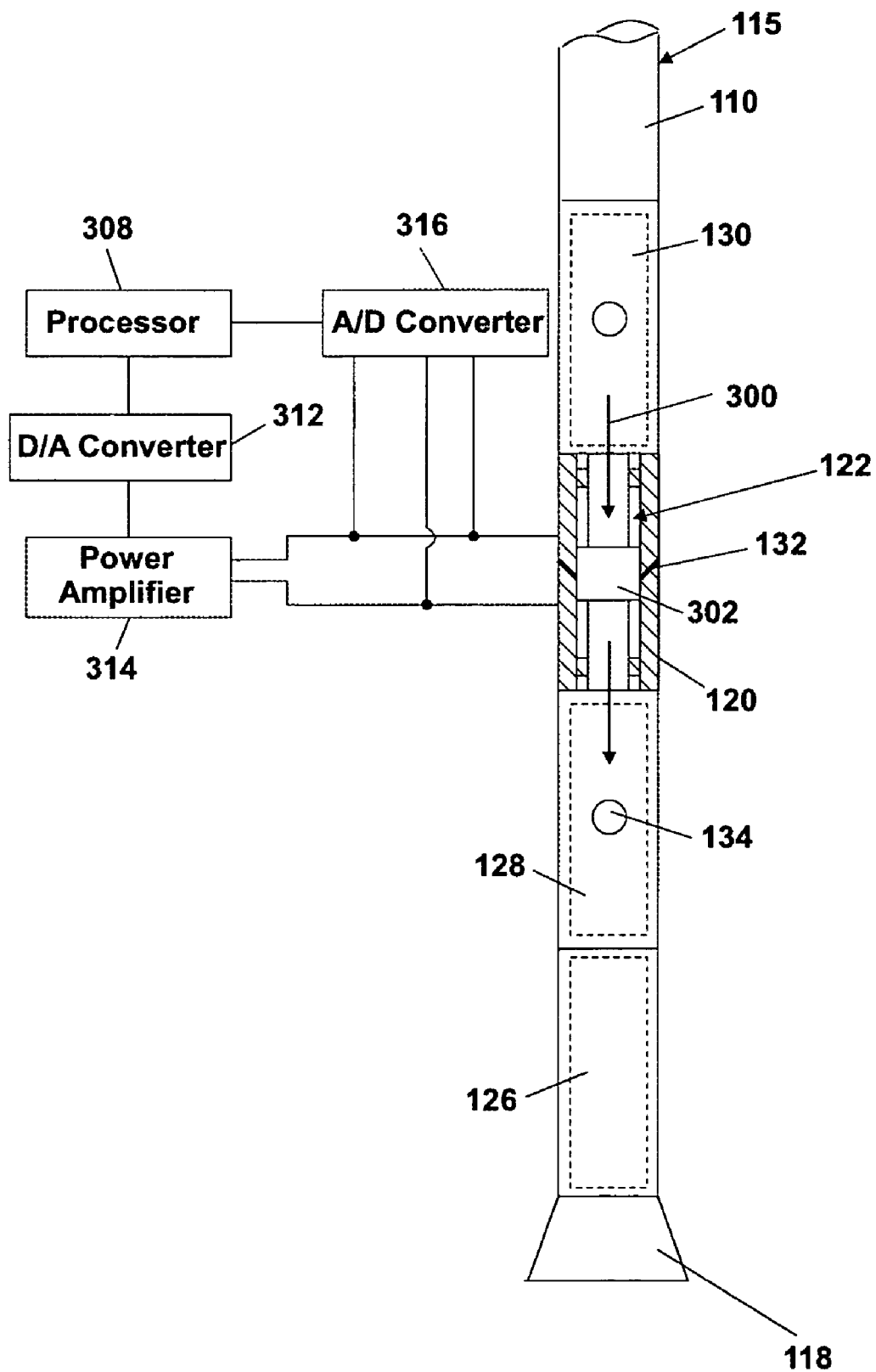
FIG. 3B is a schematic of the portion of the downhole tool of FIG. 1B illustrating broadcasting of a signal from an EMAG telemetry tool to other downhole tools in the bottomhole assembly.

FIG. 3B illustrates broadcasting of a signal from the EMAG telemetry tool 122 to a downhole tool, e.g., tool 128. After the signal is received at the insulated gap 132 and loaded into memory (310 in FIG. 3A), the inputs to the amplifier (304 in FIG. 3A) are switched into the open position so that subsequent application of power to the insulated gap 132 does not destroy the sensitive receiving circuitry. The processor 308 codes the received signal and feeds the coded signal to a digital-to-analog (D/A) converter 312. The analog signal from the D/A converter 312 drives a power amplifier 314 to produce a voltage across the insulated gap 132. The voltage results in a large axial current along the EMAG drill collar 120. The voltage is sampled with an A/D converter 316 and the current is similarly monitored. To optimize use of power, the processor 308 may adjust the signal sent to the power amplifier 314 based on the load impedance of the insulated gap 300. The current creates a magnetic field along the drill string 115, which is detected by magnetic field sensor(s) 134 in the receiving tool.

Figure 4:
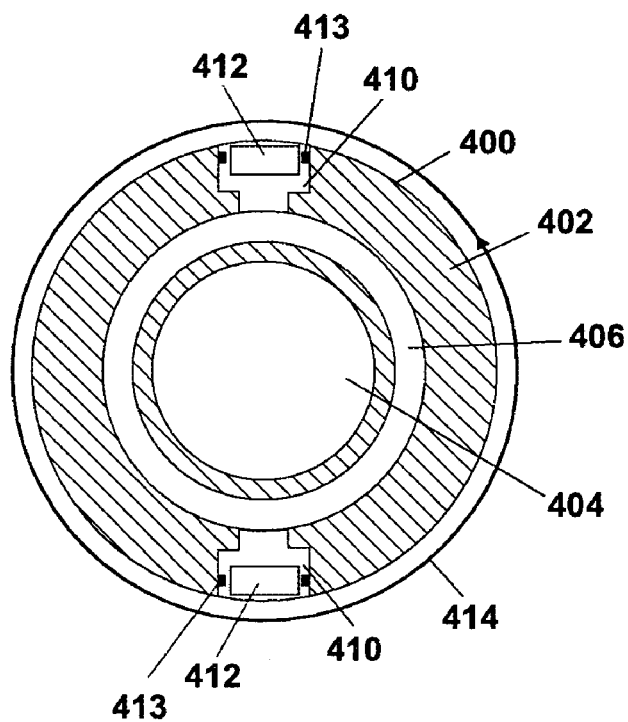
FIG. 4 is a radial cross-section of the downhole tool of FIG. 1B taken along line 4-4 depicting magnetic field sensors positioned in a drill collar of downhole tool.

Magnetic field sensors can be placed on the outside or on the inside of a drill collar. FIG. 4 shows a cross-section of a drill collar 400 having a wall 402. The drill collar 400 includes an annulus 406 for passage of drilling mud and a pressure housing for electronics 404. One or more recessed pockets 410 are formed on the outside of the wall 402 for housing one or more magnetic field sensors 412. The magnetic field sensors 412 communicate with electronics 404 inside the drill collar 400. Pressure seals 413 are formed between the magnetic field sensors 412 and the pockets 410. The pressure seals 413 may be provided by O-rings, for example. The magnetic field sensors 412 allow measurement of azimuthal magnetic field, indicated by circular arrow 414, at the surface of the drill collar 400 where it is strongest. The magnetic field sensors 412 may be, for example, single-axis magnetometers, such as fluxgate magnetometers, having their axis of sensitivity oriented in the azimuthal direction in order to maximize the signal strength. Other examples of sensors that may be used include, but are not limited to, Hall effect sensors and magnetoresistive sensors.

A single magnetic field sensor 412 detects the azimuthal magnetic field and the Earth's magnetic field. If the drill collar 400 is rotating, the Earth's magnetic field will produce an additional signal at the frequency of the rotating drill collar 400. Therefore, if a single magnetic field sensor 412 is used to detect the signal from the EMAG telemetry tool, this additional signal component would have to be removed from the output of the magnetic field sensor 412 using a signal conditioning procedure. For example, the rotation of the drill collar 400 can be independently measured, and the signal at the rotation frequency can be subtracted in a downhole signal processor. The rotation frequency of the drill collar 400 can be obtained from accelerometers located inside the drill collar 400.

However, it may be easier to remove the additional signal from the Earth's magnetic field if two magnetic field sensors 412 located on opposite sides of the drill collar 400 are used. Assuming that the sensitive axis of the magnetic field sensors 412 are aligned in the same direction, the sum of the two signals from the magnetic field sensors 412 would measure the Earth's magnetic field, or any other constant external magnetic field, while the difference would measure only the azimuthal magnetic field. Hence, the difference measurement can be used to receive signals from the EMAG telemetry tool free from contamination from the Earth's magnetic field.

In some cases, it may be difficult to mount magnetic field sensors on the outer surface of a drill collar or connect magnetic field sensors mounted on the outer surface of the drill collar with electronics located inside the drill collar. In these cases, it may be preferable to locate the magnetic field sensors inside the drill collar.

Figure 5A:
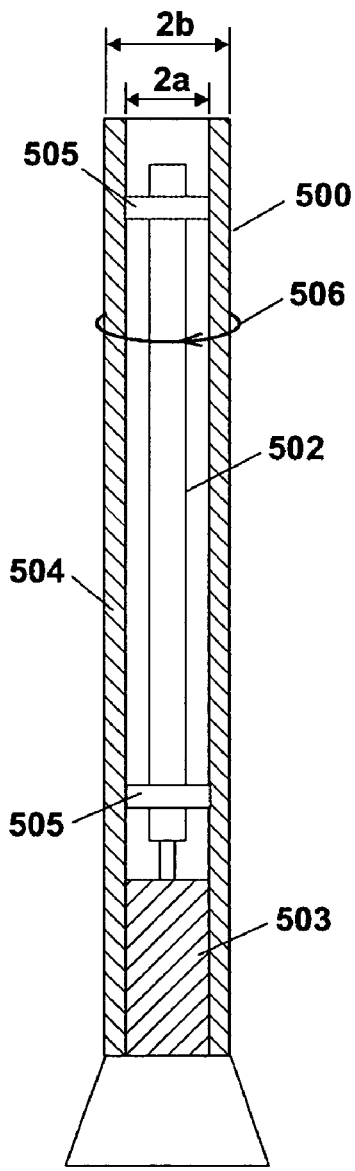
FIG. 5A shows a cut-away view of a prior-art rotary steerable system.

FIG. 5A shows a cross-section of a power-drive rotary steerable system 500. Examples of other rotary steerable systems are provided in U.S. Pat. Nos. 5,265,682 and 5,520,255. The rotary steerable system of FIG. 5A has a geostationary control unit 502 that controls a steering or bias unit 503. This geostationary control unit 502 is mounted on the axis of a drill collar 504 and is attached to bearings 505 on each end. This allows the drill collar 504 to rotate about the control unit 502 while the control unit 502 remains geostationary. Because of this mechanical configuration, it is very difficult to run wires from the control unit 502 to the drill collar 504. Thus, if a magnetic field sensor is located on the outside of the drill collar 504, a complex and probably unreliable modification may be needed to connect the sensor to electronics inside the control unit 502. In this case, it may be advantageous to mount the magnetic field sensor within the geostationary control unit 502 and to use the magnetic field sensor to receive signals from the EMAG telemetry tool.

Let the drill collar 504 have an inner radius a and an outer radius b. For $r \geq b$, an axial current I(z) along the drill collar 504 produces an azimuthal magnetic field B given by equation (2) above. This azimuthal magnetic field is indicated by the circular line 506. At low frequencies, the axial current is uniformly distributed throughout the cross-section of the drill collar 504 wall (i.e. for a≦r≦b). The skin depth $\delta_c$ that the current penetrates into the conductive drill collar 504 is given by $$\delta_c = (\pi f \mu_0 \mu' \sigma_c)^{-1/2} \qquad (3)$$

where $\mu'$ is the relative permeability of the drill collar and $\sigma_c$ is the conductivity of the drill collar. For non-magnetic steel, $\sigma_c \approx 1.4 \cdot 10^6$ S/m and $\mu'=1$. At $f=10$ Hz, the skin depth is 13 cm, which is much thicker than a typical drill collar wall. For magnetic steel with $\mu'=100$, the skin depth is about 4 cm. Hence, the axial current fully penetrates the drill collar 504 wall.

However, this does not mean that the magnetic field (B) associated with the axial current penetrates into the interior of the drill collar. For r<a, the magnetic field is zero for an azimuthally symmetric drill collar. This follows from Maxwell's equations. By evaluating the integrals $\oint \vec{B} \cdot \vec{dl} = \mu_0 \int \vec{J} \cdot \vec{dA}$, where the left hand integral is evaluated over a circle (d $\vec{l}$) of radius r<a and the right hand integral is evaluated over the cross-sectional area (d $\vec{A}$) of that circle. The current flux, $\vec{J}$, is zero inside the drill collar because the axial current only flows on the drill collar wall. Hence, it follows that B=0 inside the drill collar. If the drill collar is slightly asymmetric, for example by machining a notch on one side, some magnetic field may penetrate into the control unit, but is typically small. Also, removing too much material from the drill collar wall thickness may adversely affect the drill collars strength, which is typically undesirable.

Figure 5B:
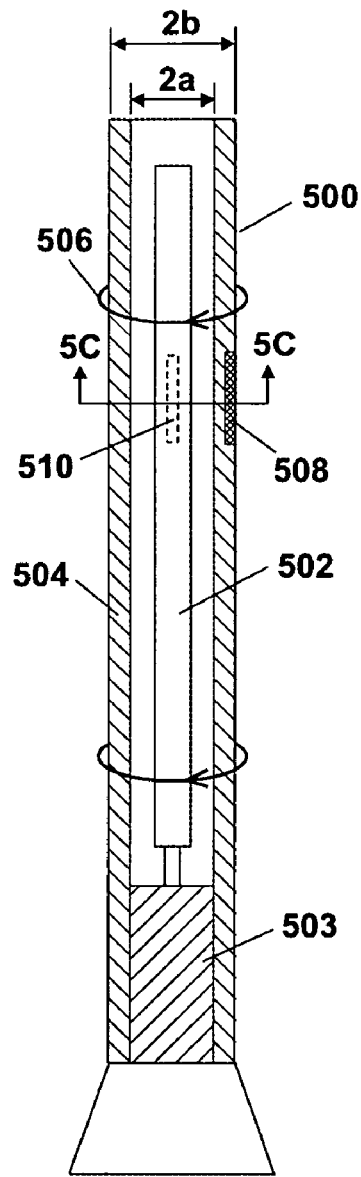
FIG. 5B is a longitudinal cross section of a portion of the downhole tool of FIG. 1A depicting a rotary steerable system provided with a magnetic field sensor and a magnetic insert.
Figure 5C:
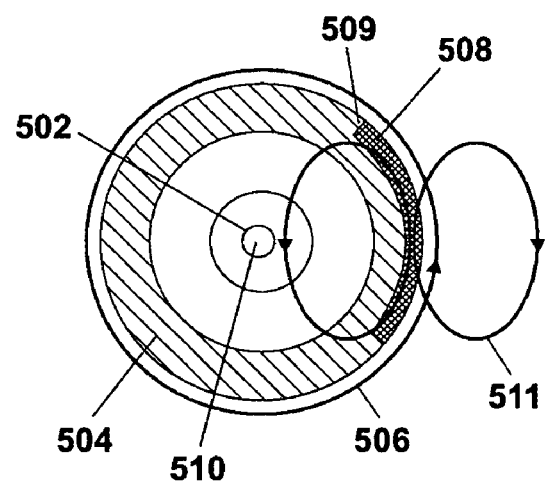
FIG. 5C is a horizontal cross section of the portion of the downhole tool of FIG. 5B taken along line 5C-5C depicting the magnetic insert.

As illustrated in FIGS. 5B and 5C, a magnetic field can be induced inside the drill collar 504 by adding a magnetic insert 508 having a high magnetic permeability ($\mu' \gg 1$) outside the drill collar 504. A suitable magnetic material may be, for example, mu-metal, which can be formed into a "C"-shape to match the curvature of the drill collar 504, and placed in a shallow groove 509 on the outer surface of the drill collar 504. Typical dimensions for the high magnetic permeability insert 508 may be 1 to 6 inches long, 0.05 to 0.5 inches thick, and with 30°-180° arc. Because of the high permeability, the magnetic insert 508 concentrates the magnetic field lines and breaks the azimuthal symmetry of the drill collar 504 without affecting the strength of the drill collar 504. The resulting magnetic field can be viewed as a superposition of the original or primary azimuthal magnetic field, indicated at (506 in FIG. 5C), and a secondary magnetic dipole field, indicated at (511 in FIG. 5C).

Referring to FIG. 5C, the secondary magnetic field produces a non-zero magnetic field inside the drill collar 504. Because the frequency of the telemetry signal is relatively low, e.g., 1-20 Hz, the skin depth in the drill collar 504 material is typically larger than the wall thickness of the drill collar 504. Therefore, the secondary magnetic field penetrates into the geostationary control unit 502, where the magnetic field sensor 510 is located. Preferably, the drill collar 504 is non-magnetic to increase the asymmetry in magnetic permeability and to increase the skin depth. The magnetic field sensor 510 located in the geostationary control unit 502 can detect the secondary magnetic field. Preferably, the magnetic field sensor is located underneath the magnetic material 508 on the drill collar 504. As the drill collar 504 rotates and the control unit 502 remains geostationary, the magnetic field sensor 510 signal may be modulated by the rotation rate of the drill collar 504. The rotation rate may be determined from other measurements and can selectively be suppressed or removed by signal conditioning as described above.

Figure 5D:
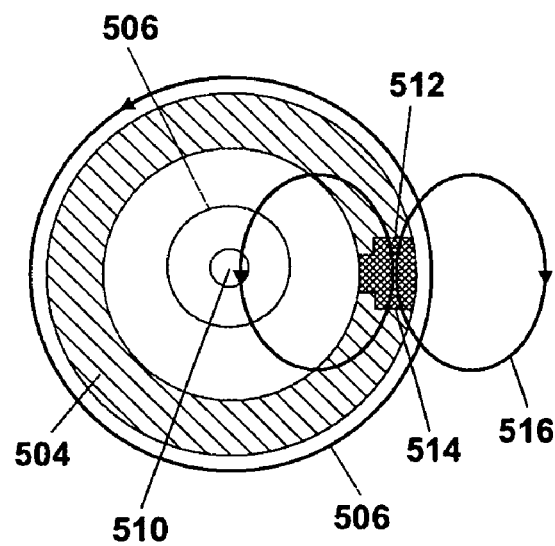
FIG. 5D is a variation of the cross-section shown in FIG. 5C.

FIG. 5D illustrates a variation to the technique shown in FIGS. 5B and 5C. The variation is to mount a magnetic insert 512 having a relatively high magnetic permeability in an opening 514 in the wall of the drill collar 504. The magnetic insert 512 extends across the wall thickness of the drill collar 504 and produces the secondary magnetic field, indicated at 516, inside the geostationary control unit 502. The magnetic insert 512 could be made entirely of magnetic material, or could house magnetic material. To maintain the pressure differential between the inside and the outside of the drill collar 514, the magnetic insert 512 must form a pressure barrier. This can be accomplished, for example, by using O-ring seals and threading the magnetic insert 512 into the wall of the drill collar 504.

The invention typically provides the following advantages. Significant hardware modifications to the EMAG telemetry tool and downhole tools may not be needed to enable wireless communication between the EMAG telemetry tool and the downhole tools. For the downhole tool, the modifications may simply include adding magnetic material to the exterior of the drill collar and adding a magnetic field sensor inside the drill collar or adding small magnetic field sensors in the wall of the drill collar. The EMAG telemetry system can depend on measurement of magnetic field created by modulating axial current along the drill string. Existing downhole EMAG telemetry systems may be based on detecting the electromotive force (EMF) induced in a coil or transformer, as described in for example, U.S. Pat. No. 4,899,112. EMF is proportional to the rate of change of the magnetic field, thus proportional to the frequency. Hence, such systems may be much less efficient at the very low frequencies (1-20 Hz) produced by typical EMAG telemetry tools. They normally must operate at frequencies from 1 kHz to 100 kHz to be efficient. This EMAG telemetry system described above could be a backup for a wired communications system or could be used as a primary communications system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wireless electromagnetic telemetry system for broadcasting signals across a bottomhole assembly disposed in a borehole drilled through a subterranean formation, comprising:

an insulated gap at a first point in the bottomhole assembly;
at least one magnetic field sensor at a second point in the bottomhole assembly;
a circuitry which modulates a voltage across the insulated gap, the voltage generating an axial current along the bottomhole assembly that results in an induced magnetic field; and
a magnetic material mounted on an outer surface of a downhole tool in the bottomhole assembly rendering the induced magnetic field inside the downhole tool non-zero.

2. The wireless electromagnetic telemetry system of claim 1, further comprising a signal transmission link from a surface location to the insulated gap which receives a signal.

3. The wireless electromagnetic telemetry system of claim 2, wherein the circuitry modulates the voltage according to the signal.

4. The wireless electromagnetic telemetry system of claim 1, wherein an output of the magnetic field sensor includes information related to operation of a downhole tool in the bottomhole assembly.

5. The wireless electromagnetic telemetry system of claim 4, wherein the downhole tool is selected from the group consisting of measurements-while-drilling tools, logging-while-drilling tools, and directional drilling tools.

6. The wireless electromagnetic telemetry system of claim 1, wherein the magnetic field sensor is selected from a group consisting of fluxgate magnetometer, Hall effect sensor, and magnetoresistive sensor.

7. The wireless electromagnetic telemetry system of claim 4, wherein the downhole tool is located at the second point in the bottomhole assembly.

8. The wireless electromagnetic telemetry system of claim 1, wherein the magnetic field sensor is located inside the downhole tool and underneath the magnetic material.

9. The wireless electromagnetic telemetry system of claim 4, further comprising a magnetic material mounted in an opening in a wall of the downhole tool.

10. The wireless electromagnetic telemetry system of claim 4, wherein at least two magnetic field sensors are located at opposite sides of the downhole tool to measure the magnetic field.

11. A bollomhole assembly including a wireless electromagnetic telemetry system that enables broadcasting of signals across the bottomhole assembly, comprising:
    an insulated gap located in a first downhole tool in the bottomhole assembly;
    at least one magnetic field sensor located in a second downhole tool in the bottomhole assembly, the magnetic field sensor configured to measure an induced magnetic field at the second downhole tool;
    a circuitry connected across the insulated gap that modulates a voltage across the insulated gap, wherein modulation of the voltage creates an axial current along the bottomhole assembly that induces the magnetic field at the second downhole tool; and
    a magnetic material mounted on an outer surface of the second downhole tool rendering the induced magnetic field inside the second downhole tool non-zero.

12. The bottomhole assembly of claim 11, further comprising a signal transmission link from a surface location to the insulated gap which receives a signal.

13. The bottomhole assembly of claim 12, wherein the circuitry modulates the voltage according to the signal.

14. The bottomhole assembly of claim 11, wherein an output of the magnetic field sensor includes information related to operation of the second dowuhole tool in the bottomhole assembly.

15. The bottomhole assembly of claim 14, wherein the first downhole tool is selected from the group consisting of measurements-while-drilling tools and logging-while-drilling tools.

16. The bottomhole assembly of claim 14, wherein the second downhole tool is selected from the group consisting of measurements-while-drilling tools, logging-while-drilling tools, and directional drilling tools.

17. The bottomhole assembly of claim 11, wherein the magnetic field sensor is selected from a group consisting of fluxgate magnetometer, Hall effect sensor, and magnetoresistive sensor.

18. The bottomhole assembly of claim 14, wherein the magnetic field sensor is located inside the second downhole tool and underneath the magnetic material.

19. The bottomhole assembly of claim 18, wherein the downhole tool is a rotary steerable system and the magnetic field sensor is located in a geostationary component of the rotary steerable system.

20. The bottomhole assembly of claim 14, further comprising a magnetic material mounted in an opening in a wall of the second downhole tool.

21. The bottomhole assembly of claim 20, wherein the magnetic field sensor is located inside the second downhole tool and underneath the magnetic material.

22. The bottomhole assembly of claim 21, wherein the second downhole tool is a rotary steerable system and the magnetic field sensor is located in a geostationary component of the rotary steerable system.

23. The bottomhole assembly of claim 11, wherein at least two magnetic field sensors are located at opposite sides of the second downhole tool to measure the magnetic field.

24. A method of broadcasting a signal across a bottomhole assembly disposed in a borehole drilled through a subterranean formation, comprising:
    providing a magnetic material disposed on an outer surface of the bottomhole assembly:
    producing a voltage across an insulated gap at a first point in the bottomhole assembly;
    modulating the voltage produced across the insulated gap, such that the voltage generates an axial current along the borehole assembly that induces a non-zero magnetic field at a second point inside the bottomhole assembly; and
    measuring the non-zero induced magnetic field at a second point inside the bottomhole assembly.

25. The method of claim 24, further comprising receiving the signal at the insulated gap.

26. The method of claim 25, wherein modulating the voltage comprises modulating the voltage according to the signal.

27. The method of claim 24, further comprising controlling operation of a downhole tool using an output of the one or more magnetic field sensors.

28. The method of claim 24, further comprising removing contribution of the Earth's magnetic field from the output of the one or more magnetic field sensors.

29. The method of claim 28, wherein removing contribution comprises independently measuring rotation of a drill collar in the bottomhole assembly and subtracting rotation of the drill collar from the output of the one or more magnetic field sensors.

* * * * *